(12) United States Patent
Lin

(10) Patent No.: US 7,107,053 B2
(45) Date of Patent: Sep. 12, 2006

(54) METHOD AND SYSTEM FOR HANDLING MOBILE DATABASE OVERFLOW

(75) Inventor: Hwa-Chun Lin, Hsinchu (TW)

(73) Assignee: Institute of Information Industry, Taipei (TW)

( * ) Notice: Subject to any disclaimer, the term of this patent is extended or adjusted under 35 U.S.C. 154(b) by 195 days.

(21) Appl. No.: 10/811,212

(22) Filed: Mar. 26, 2004

(65) Prior Publication Data

US 2005/0143069 A1  Jun. 30, 2005

(30) Foreign Application Priority Data

Dec. 25, 2003  (TW) ............................. 92136817 A

(51) Int. Cl.
*H04Q 7/20* (2006.01)

(52) U.S. Cl. ............................. 455/435.1; 455/404.2; 455/414.2; 455/433; 455/456.1

(58) Field of Classification Search .......... 455/404.2, 455/414.2, 433, 435.1, 456.1, 456.2, 456.3, 455/456.4, 456.5, 456.6

See application file for complete search history.

(56) References Cited

U.S. PATENT DOCUMENTS

| | | | | |
|---|---|---|---|---|
| 5,819,178 A * | 10/1998 | Cropper | ...................... | 455/433 |
| 6,021,327 A * | 2/2000 | Nguyen et al. | ............. | 455/433 |
| 6,224,477 B1 * | 5/2001 | Ho et al. | .................... | 455/433 |
| 6,324,399 B1 * | 11/2001 | Salmivalli | ................... | 455/433 |
| 6,463,284 B1 * | 10/2002 | Nakamura et al. | .......... | 455/433 |
| 6,594,490 B1 * | 7/2003 | Toyoda et al. | ............. | 455/433 |
| 6,597,909 B1 * | 7/2003 | Takubo et al. | ............. | 455/433 |
| 2002/0002048 A1 * | 1/2002 | Vaisanen | .................... | 455/432 |

* cited by examiner

*Primary Examiner*—Lester G. Kincaid
*Assistant Examiner*—Shantell Portis
(74) *Attorney, Agent, or Firm*—Thomas, Kayden, Horstemeyer & Risley

(57) ABSTRACT

A method and system for handling mobile database overflow. First, the VLR determines whether its database is full when a first mobile user sends a registration request to the VLR. The VLR selects a second mobile user as an overflow user and translates the location information thereof into a second location code if the database of the VLR is full. Next, the registration request and the second location code are transferred to an HLR and the value of a first location code of the first mobile user is reset as the predetermined value. Finally, user data of the second mobile user is deleted and user data of the first mobile user is temporarily stored in the VLR.

16 Claims, 4 Drawing Sheets

METHOD AND SYSTEM FOR HANDLING MOBILE DATABASE OVERFLOW

BACKGROUND OF THE INVENTION

1. Field of the Invention

The present invention relates to a method and system for data processing, and in particular to a method and system for handling mobile database overflow.

2. Description of the Related Art

A mobile communication system covers a plurality of service areas, each divided into a plurality of location areas, each consisting of one or more base transceiver stations (BSC).

FIG. 1 is a schematic diagram showing the architecture of a mobile communication system, consisting of the following functional elements.

A home location register (HLR) 100 regulates a database storing user data, comprising user parameters and location information, of mobile users, in which each user must be registered in HLR 100. A visitor location register (VLR) 120 stores and processes call connection information, such as cellular phone numbers of users, location area identifiers, and service parameters. A mobile switch center (MSC) 140 provides switching and call delivery functions to mobile stations (MS) in a regulated location area. A base station controller (BSC) 160 regulates one or more base transceiver stations (BS). A base station system (BSS), which is a wireless communication subsystem regulated by MSC 140 communicating with mobile stations, consists of a BSC and corresponding base transceiver stations.

A base transceiver station (BS) 165 is a small local wireless equipment, providing wireless interface for mobile stations. A location area (LA) 180, regulated by a mobile switch center, consists of base transceiver stations regulated by a BSC. Each location area may comprise one or more base transceiver stations and has a location area identifier (LAI) by which the mobile communication system identifies the location of a mobile user. To locate a mobile station, the described system can page the mobile station by broadcasting to the location area in which the mobile station is located.

A mobile database, namely a VLR, is located at each service area. A mobile station requests registration on the system when entering a service area and the VLR temporarily stores user data of the mobile station with successful registration, then deletes the user data of the mobile station, when the mobile station moves out of the service area. A VLR reaches its maximum capacity when a predetermined large number of mobile stations enter the same location area, preventing subsequent mobile stations entering the service area from successful registration.

A conventional method for solving the above problem is described as follows. The VLR deletes a registration record according to a policy to satisfy the requirement of a new registration request. The mobile user, whose user data is deleted by the VLR, is called an overflow user. The VLR enables the mobile station of the overflow user to be re-registered when the overflow user makes a call unsuccessfully, and the overflow user re-sends a call origination request. In addition, when someone makes a call to the overflow user, the VLR informs the base station controllers of all location areas regulated by the MSC, in which the overflow user is located, to search for the location of the overflow user by broadcasting.

The described method, however, makes a large scale broadcast to all base station controllers regulated by a MSC when delivering a call to an overflow user, hence utilizing more hardware and software resources and bandwidth of a wireless network. Therefore, a method and system to overcome the above described drawback is desirable.

SUMMARY OF THE INVENTION

Accordingly, an objective of the present invention is to provide a method and system for handling mobile database overflow, searching for a mobile user by broadcasting to the base station controllers of a single location area where the mobile user resides, thus saving software and hardware resources and bandwidth of a wireless network.

Another objective of the invention is to provide a method and system for handling mobile database overflow.

According to the objectives described above, the present invention provides a method for handling mobile database overflow, registering an un-registered mobile user located in a location area to a VLR. A location information table is created in each VLR, comprising a location code field, a location area identifier (LAI) field, and an MSC address field. In addition, an extra field is added to a HLR for storing location codes.

When a first mobile user sends a registration request to a VLR, the VLR determines whether its database is full. If the database of the VLR is not full, the first mobile user is registered to the HLR, the value of a first location code of the first mobile user is set as zero, and user data thereof is temporarily stored in the VLR. If the VLR is full and does not include the user data of the first mobile user, the VLR selects an idle user, named a second mobile user, as an overflow user; and translates the location information of the second mobile user into a second location code.

Next, the registration request and the second location code are transferred to the HLR and the value of the first location code is reset as zero. Finally, the VLR deletes the user data of the second mobile user and the user data of the first mobile user is temporarily stored in the VLR.

The present invention further provides a system for handling mobile database overflow, registering to a VLR of an un-registered mobile user located in a location area. The system comprises an HLR, a VLR, a first mobile user, and a second mobile user.

The VLR determines whether its database thereof is full when receiving a registration request from a first mobile user. If the database of the VLR is not full, the first mobile user is registered to the HLR, the value of a first location code of the first mobile user is set as zero, and user data thereof is temporarily stored in the VLR. If the database of the VLR is full and does not include the user data of the first mobile user, the VLR selects an idle user, named a second mobile user, as an overflow user; and translates the location information of the second mobile user into a second location code.

Next, the registration request and the second location code are transferred to the HLR and the value of the first location code is reset as zero. Finally, the VLR deletes user data of the second mobile user and the user data of the first mobile user is temporarily stored in the VLR.

The present invention further provides a method and system for handling mobile database overflow, finding the location of an overflow user to deliver a call. An HLR determines whether the value of the location code of a mobile user is a predetermined value (i.e., zero) when a mobile communication system receives a call request to the mobile user. The system sets up the call between the caller and the mobile user if the value of the location code is the predetermined value.

If the value of the location code is not the predetermined value, the location information of the mobile user is obtained as follows. The HLR sends the location code of the mobile user to the VLR. Next, the VLR looks up the location information table using the location code of the mobile user to obtain an MSC address and an LAI of a location area. The VLR informs the MSC of the location area where the mobile user resides. The MSC notifies the BSC of the location area to search for the location of the mobile user. The BSC obtains the location of the mobile user by broadcasting to the location area. The MSC obtains the location of the mobile user from the BSC. After obtaining the location of the mobile user from the MSC, the VLR notifies the HLR of the location of the mobile user and re-registers the user information in its database. The system can then sets up the call between the caller and the mobile user.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention discloses a method and system for handling mobile database overflow.

Figure 1:
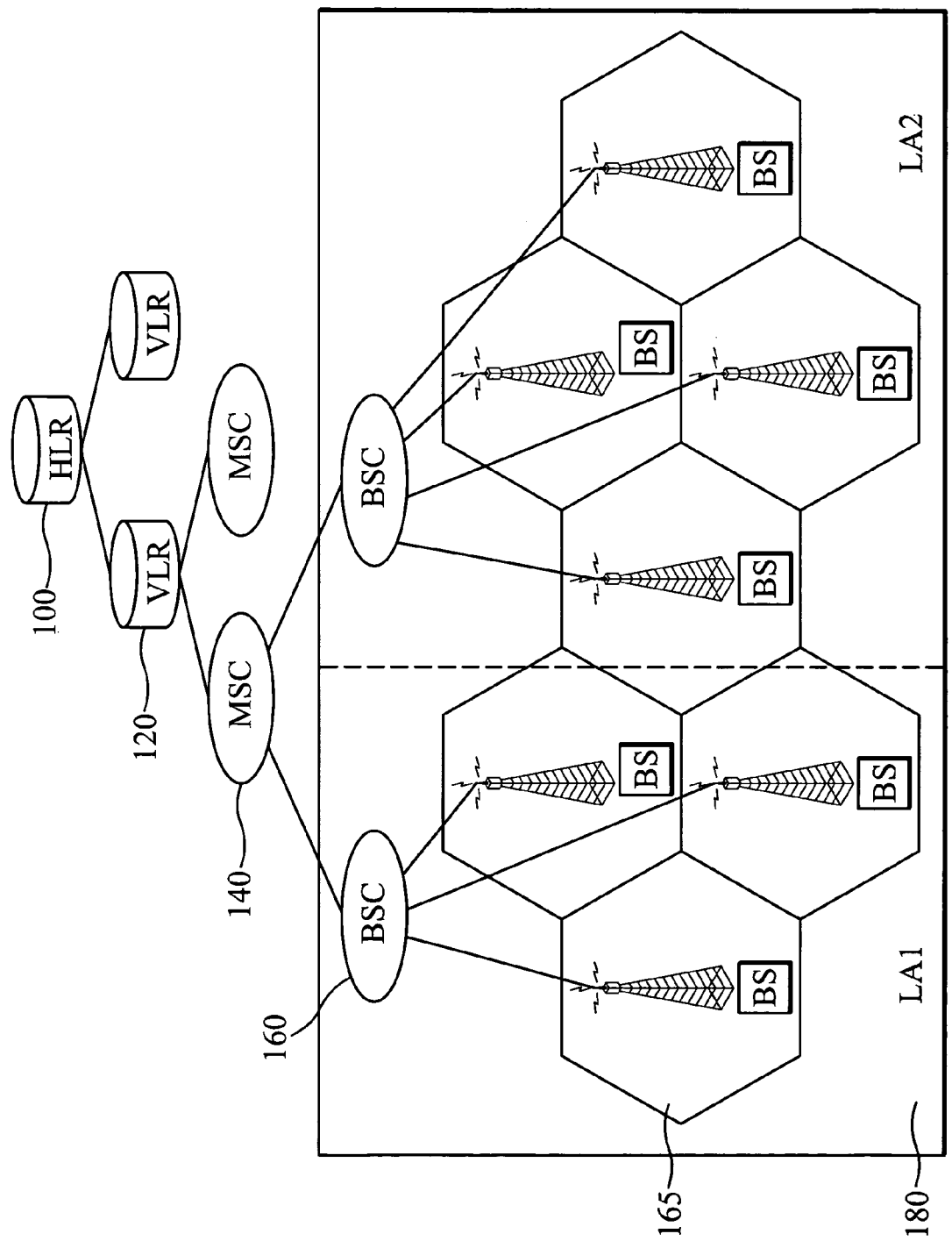
FIG. 1 is a schematic diagram showing the architecture of a mobile communication system.
Figure 2:
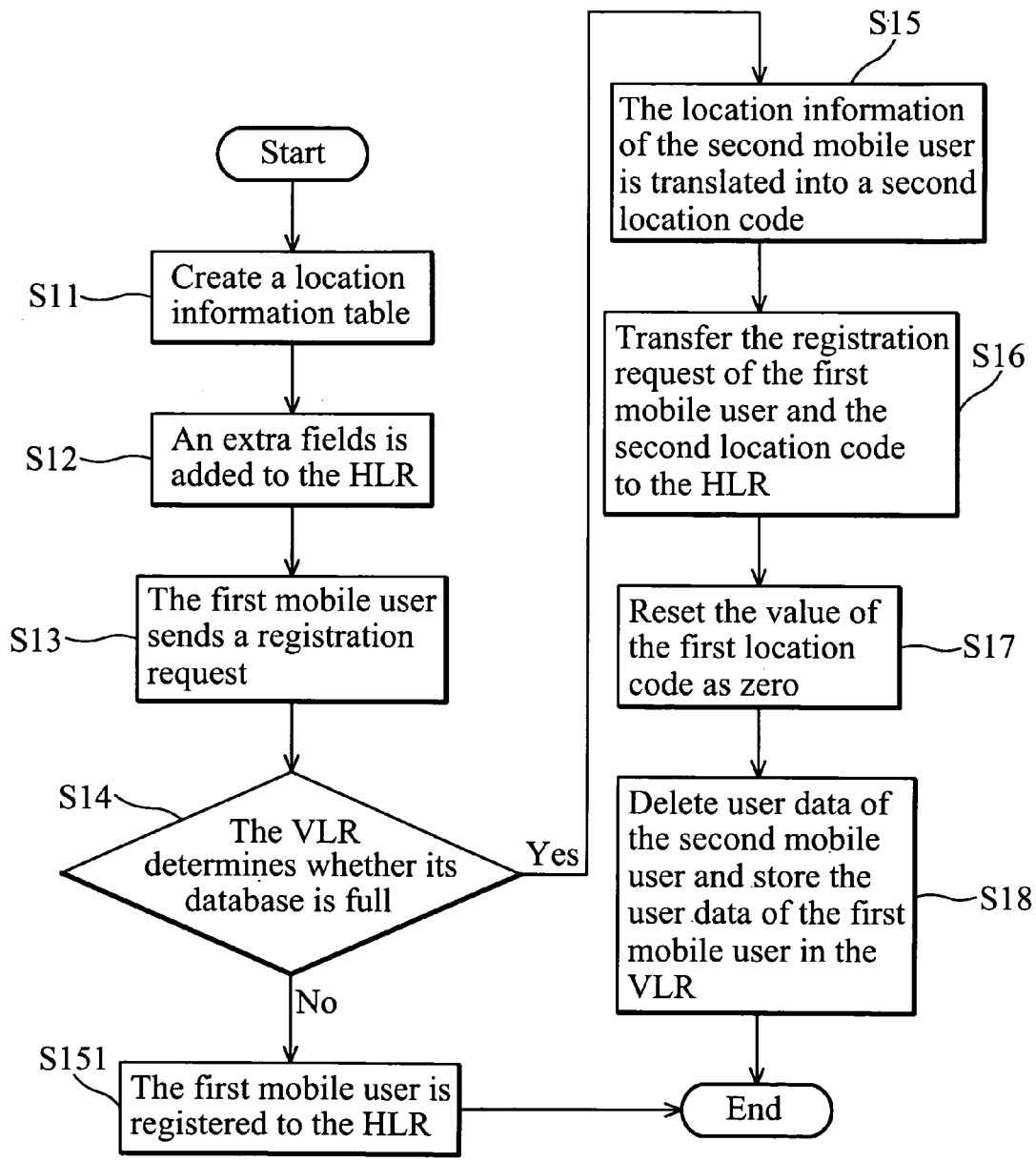
FIG. 2 is a flowchart of the detailed steps of the method for handling mobile database overflow according to the present invention.

FIG. 2 is a flowchart of the detailed steps of the method for handling mobile database overflow according to the present invention.

First, a location information table is created in each VLR (step S11), comprising a location code field, an LAI (location area identifier) field, and an MSC (mobile switch center) address field, depicted as follows:

TABLE 1

| Location Code | LAI | MSC Address |
| --- | --- | --- |
| 1 | LAI 1 | MSCA 1 |
| 2 | LAI 2 | MSCA 2 |
| ... | ... | ... |
| N | LAI n | MSCA n |

The locations areas regulated by each VLR are numbered sequentially. The number assigned to a location area is the location code of the location area. Each location area is regulated by only one VLR, and therefore, the corresponding MSC address can be acquired when the LAI of a location area of a mobile user is obtained. The location code of a mobile user represents the LAI of the location area where the mobile user resides and the address of the corresponding MSC as shown in table 1.

In addition, an extra field is added to the HLR for storing location codes (step S12), wherein a mobile user is not an overflow user when the value of the location code thereof is zero. Next, a first mobile user sends a registration request (step S13) and the VLR determines whether its database is full (step S14).

If the database of the VLR is not full, the first mobile user is registered to the HLR (step S151), the value of a first location code thereof is set as zero and user data of the first mobile user is then temporarily stored in the VLR.

If the database of the VLR is full and does not include the user data of the first mobile user, the VLR selects an idle user, a second mobile user who becomes an overflow user, and translates the location information of the second mobile user into a second location code (step S15).

Next, the registration request of the first mobile user and the second location code are transferred to the HLR, the second location code is stored in the HLR (step S16), and the value of the first location code is reset as zero (step S17). Finally, the VLR deletes user data of the second mobile user and the user data of the first mobile user is temporarily stored in the VLR (step S18).

Figure 3:
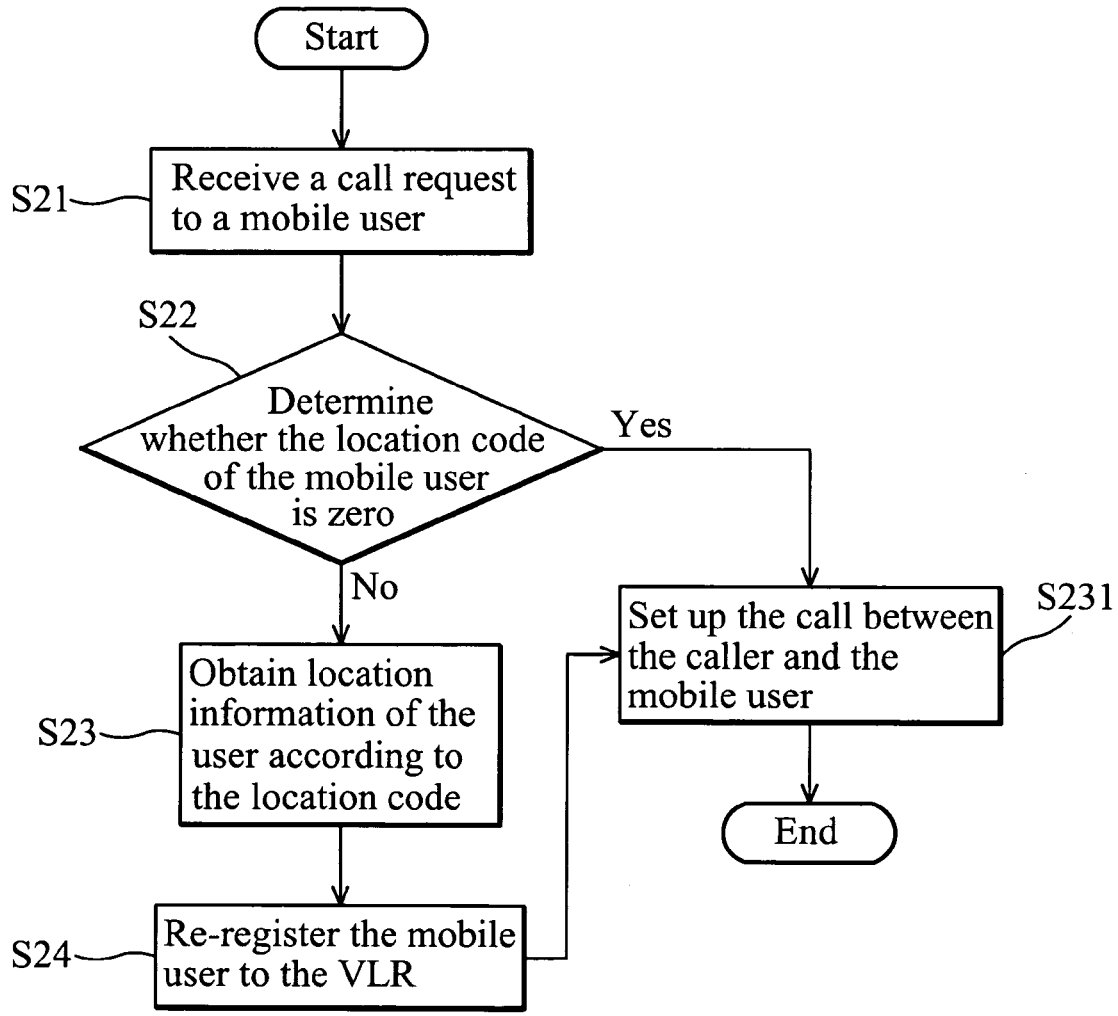
FIG. 3 is a flowchart of the detailed steps of the method for re-registering an overflow user according to the present invention.

FIG. 3 is a flowchart of the detailed steps of the method for re-registering an overflow user according to the present invention.

When The mobile communication system receives a call request to a mobile user (step S21), the HLR determines whether the value of a location code of the mobile user is the predetermined value (i.e., zero) (step S22). If the value of the location code is the predetermined value, the system sets up the call between the caller and the mobile user (step S231).

If the value of the location code is not the predetermined value, the location information of the mobile user is obtained as follows. The HLR sends the location code of the mobile user to the VLR. Next, the VLR looks up the location information table using the location code of the mobile user to obtain an MSC address and an LAI of a location area for the mobile user. The VLR informs the MSC of the location area where the mobile user resides. The MSC notifies the BSC of the location area to search for the location of the mobile user. The BSC obtains the location of the mobile user by broadcasting to the location area. The MSC obtains the location of the mobile user from the BSC (step S23). After obtaining the location of the mobile user from the MSC, the VLR notifies the HLR of the location of the mobile user and re-registers the user information in its database (step S24). The system can then sets up the call between the caller and the mobile user.

While re-registering the mobile user in step S24 of the process described above, the possibility of a VLR database overflow also needs to be considered. If a database overflow occurs, it is handled in the same manner as described in FIG. 2.

Figure 4:
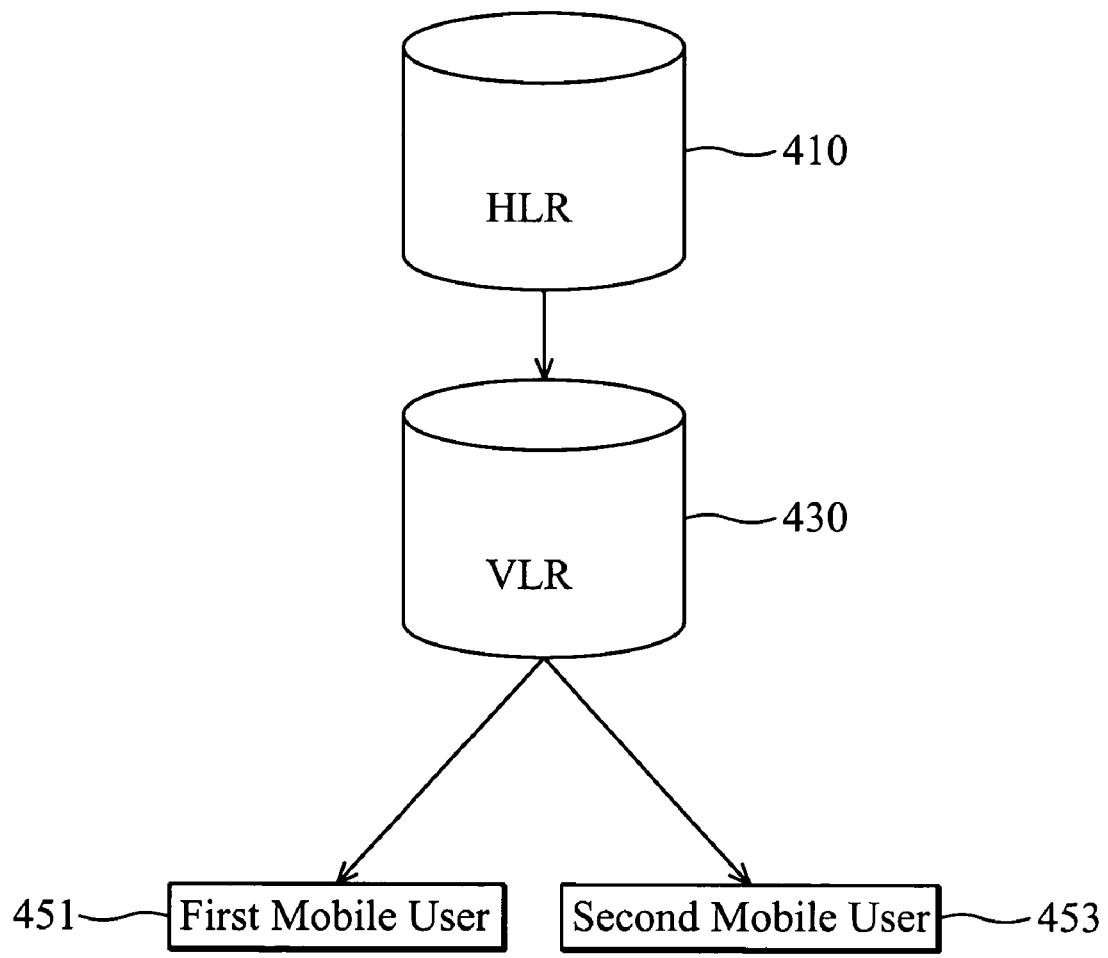
FIG. 4 is a schematic diagram of the architecture of the system for handling mobile database overflow according to the present invention.

FIG. 4 is a schematic diagram of the architecture of the system for handling mobile database overflow according to the present invention.

The architecture comprises an HLR 410, a VLR 430, a first mobile user 451, and a second mobile user 453. VLR 430 receives a registration request sent from the first mobile user 451, and determines whether its database thereof is full. If the database of VLR 430 is not full, the first mobile user 451 is registered to the VLR 430. If the database of VLR 430 is full, VLR 430 selects a second mobile user 453 as an overflow user, translates location information of which into a second location code, deletes user data of the second mobile user 453 thereof, and stores user data of the first mobile user 451 in VLR 430.

Next, the registration request of the first mobile user 451 and the second location code of second mobile user 453 are transferred to HLR 410 and HLR 410 resets the value of the first location code of first mobile user 451 as zero and stores the second location code of second mobile user 453.

When the mobile communication system receives a call to the first mobile user 451, HLR 410 checks the first location code of first mobile user 451. If the value of the first location code is zero, the system sets up the call between the caller and the first mobile user 451. Otherwise, the first location code is transferred to VLR 430. VLR 430 obtains the location information of first mobile user 451 in accordance with a location information table thereof, re-registering the first mobile user 451. Similarly, if the database of VLR 430 is full, the problem of database overflow of VLR 430 is solved as mentioned above.

The method of the present invention solves the problem of mobile database overflow, by broadcasting to a single location area to search for the desired mobile user, thereby saving software and hardware resources and bandwidth of a wireless network.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for handling mobile database overflow, registering an un-registered mobile user located in a location area, comprising the steps of;
   obtaining a registration request from a first mobile user;
   determining whether the database of a visitor location register (VLR) is full;
   registering the first mobile user to a home location register (HLR) if the database of the VLR is not full;
   temporarily storing user data of the first mobile user in the VLR;
   translating the location information of a second mobile user registered in the VLR into a second location code if the database of the VLR is full;
   transferring the registration request and the second location code to the HLR;
   resetting the value of a first location code of the first mobile user as a predetermined value; and
   deleting user data of the second mobile user and temporarily storing the user data of the first mobile user in the VLR.

2. The method as claimed in claim 1, wherein the VLR comprises a location information table.

3. The method as claimed in claim 2, wherein the location information table comprises a location code field, a location area identifier (LAI) field, and a Mobile Switch Center (MSC) address field.

4. The method as claimed in claim 1, wherein the registering step translates the location information of the second location code into a second location code.

5. The method as claimed in claim 1, wherein an extra field is added to the HLR for storing location codes.

6. A system for handling mobile database overflow, registering an un-registered mobile user located in a location area comprising a first mobile user sending a registration request and a second mobile user, at least comprising:
   a VLR, storing user data of the second mobile user and receiving the registration request of the first mobile user, and
   an HLR, processing the registration request of the first mobile user, wherein the VLR determines whether its database thereof is full, the first mobile user is registered to the HLR if the database is not full, user data of the first mobile user is temporarily stored in the VLR, location information of the second mobile user is translated into a second location code if the database is full, the registration request and second location code are transferred to the HLR, the value of a first location code of the first mobile user is reset as a predetermined value, the user data of the second mobile user is deleted, and the user data of the first mobile user is temporarily stored in the VLR.

7. The system as claimed in claim 6, wherein the VLR comprises a location information table.

8. The system as claimed in claim 7, wherein the location information table comprises a location code field, an LAI field, and an MSC address field.

9. The system as claimed in claim 6, wherein the second location code of the second mobile user is stored in the HLR when the first mobile user is registered to the HLR.

10. The system as claimed in claim 6, wherein an extra field is added to the HLR for storing location codes.

11. A method for handling mobile database overflow, by searching for an overflow user, comprising the steps of:
    searching for the mobile user when receiving a call request to a mobile user;
    determining whether the value of the location code of the mobile user is a predetermined value;
    setting up the call between the caller and the mobile user if the value of the location code is the predetermined value;
    obtaining the location information of the mobile user in accordance with the location code and a location information table if the value of the location code is not the predetermined value, wherein the location information table comprises a location code field, an LAI field, and an MSC address field; and
    re-registering the mobile user for communication.

12. The method as claimed in claim 11, wherein the step of obtaining the location information of the mobile user further comprises the steps of:
    a VLR obtaining the location code corresponding to the mobile user from an HLR;
    the VLR looking up the location information table using the location code of the mobile user to obtain an MSC address and an LAI of a location area;
    the VLR informing the MSC of th location area where the moile user resides;
    the MSC notifying the BSC of the location area to search for the location of the mobile user;
    the BSC obtaining the location of the mobile user by broadcasting to the location area;
    the MSC obtaining the location of the mobile user from the BSC;
    the VLR obtaining the location of the mobile user from the MSC; and
    the VLR notifying the HLR of the location of the mobile user and re-registering the user information in its database.

13. The method as claimed in claim 12, wherein an extra field is added to the HLR for storing location codes.

14. A system for handling mobile database overflow to find the location of an overflow user to deliver a call, comprising a mobile user, at least comprising:
- a VLR, comprising a location information table; and
- an HLR wherein the HLR determines whether the value of the location code of the mobile user is the predetermined value when receiving a call request to the mobile user, the system sets up the call between the caller and the mobile user if the value of the location code is the predetermined value, the location information of the mobile user is obtained in accordance with the location code and a location information table if the value of the location code is not the predetermined value, and the mobile user is re-registered;
- wherein the location information table comprises a location code field, an LAI field, and an MSC address field.

15. The system as claimed in claim 14, further comprising a process for obtaining the location information, wherein the HLR sends the location code of the mobile user to the VLR, the VLR looks up the location information table using the location code of the mobile user to obtain an MSC address and an LAI of a location area for the mobile user, the VLR informs the MSC of the location area where the mobile user resides, the MSC notifies the BSC of the location area to search for the location of the mobile user, the BSC obtains the location of the mobile user by broadcasting to the location area, the MSC obtains the location of the mobile user from the BSC, the VLR obtains the location of the mobile user from the MSC, the VLR notifies the HLR of the location of the mobile user and re-registers the user information in its database.

16. The system as claimed in claim 15, wherein an extra field is added to the HLR for storing the location codes.

* * * * *